(12) United States Patent
Noguchi et al.

(10) Patent No.: US 6,855,394 B2
(45) Date of Patent: Feb. 15, 2005

(54) MAGNETIC RECORDING MEDIUM

(75) Inventors: Hitoshi Noguchi, Kanagawa (JP); Nobuo Yamazaki, Kanagawa (JP); Shinji Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/178,764

(22) Filed: Jun. 25, 2002

(65) Prior Publication Data

US 2003/0138668 A1 Jul. 24, 2003

(30) Foreign Application Priority Data

Jun. 26, 2001 (JP) .................................... P.2001-193199

(51) Int. Cl.$^7$ .............................................. G11B 5/708
(52) U.S. Cl. ....................... 428/141; 428/328; 428/329; 428/336; 428/694 BR; 428/694 BA
(58) Field of Search ................................ 428/141, 336, 428/328, 329, 694 BR, 694 BA

(56) References Cited

U.S. PATENT DOCUMENTS 6,096,406 A * 8/2000 Yamazaki et al. .......... 428/141

FOREIGN PATENT DOCUMENTS

| JP | 5-298653 | 11/1993 |
|---|---|---|
| JP | 10-340445 | 12/1998 |
| JP | 2000-173038 | 6/2000 |

* cited by examiner

Primary Examiner—Stevan A. Resan
(74) Attorney, Agent, or Firm—Sughrue Mion, PLLC

(57) ABSTRACT

A magnetic recording medium is disclosed, comprising a support having provided thereon a substantially nonmagnetic lower layer by coating a lower layer coating solution comprising a nonmagnetic powder dispersed in a binder and drying, and a layer having a thickness of from 0.01 to 0.15 $\mu$m by coating a magnetic layer coating solution comprising a ferromagnetic metal powder or a hexagonal ferrite powder dispersed in a binder, wherein the magnetic layer contains diamond particles having an average particle size of from 1/5 to 2 times the thickness of the magnetic layer in an amount of from 0.1 to 5.0 mass % based on the ferromagnetic metal powder.

8 Claims, No Drawings

MAGNETIC RECORDING MEDIUM

FIELD OF THE INVENTION

The present invention relates to a coating-type magnetic recording medium (i.e., a magnetic recording particulate medium), in particular, to a magnetic recording medium having a thin magnetic layer for high density recording.

BACKGROUND OF THE INVENTION

Along with a sudden increase in the amount of data to be dealt with in the field of magnetic disc, the increase of the capacity of floppy discs has been demanded.

Further, in the field of magnetic tapes also, with the spread of office computers, such as minicomputers, personal computers and work stations, magnetic tapes for recording computer data as external storage media (so-called backup tapes) have been eagerly studied in recent years. For putting magnetic tapes for such usage to practical use, the improvement of recording capacity has been strongly demanded conjointly with the miniaturization of a computer and the increase of information processing ability (e.g., information throughput).

Magnetic heads working with electromagnetic induction as the principle of operation (an induction type magnetic head) are conventionally used and spread. However, magnetic heads of this type are approaching their limit for use in the field of higher density recording and reproduction. That is, it is necessary to increase the number of winding of the coil of a reproduction head to obtain larger reproduction output, but when the winding number is increased, the inductance increases and the resistance at high frequency heightens, as a result, the reproduction output lowers. In recent years, reproduction heads which work with MR (magneto-resistance) as the principle of operation are proposed and come to be used in hard discs. As compared with the induction type magnetic disc, several times of reproduction output can be obtained by the MR head. Further, since an induction coil is not used in the MR head, noises generated from instruments, e.g., impedance noises, are largely reduced, therefore, it becomes possible to obtain a great S/N ratio by lowering the noise coming from magnetic recording media. In other words, good recording and reproduction can be done and high density recording characteristics can be drastically improved by lessening the noise of magnetic recording media hiding behind the instruments.

There is disclosed in JP-A-10-340445 (the term "JP-A" as used herein means an "unexamined published Japanese patent application") a magnetic recording medium having an upper magnetic layer which shows excellent durability, electromagnetic characteristics, in particular, excellent output and overwriting characteristics by setting the thickness of an upper magnetic layer at 0.5 $\mu$m or less to suppress the fluctuation at interface between a magnetic layer and a nonmagnetic layer. For suppressing interfacial fluctuation, the same patent adopts wet-on-dry coating of coating a nonmagnetic lower layer and then coating an upper magnetic layer after the nonmagnetic lower layer has been dried. However, the thickness of 0.3 $\mu$m of a magnetic layer prescribed in the patent is too thick and is not suitable for higher density recording. Further, in general, the durability of a magnetic recording medium produced by wet-on-dry coating is liable to be deteriorated, and this tendency is more conspicuous when the thickness of a magnetic layer is thin.

JP-A-5-298653 ensures high electromagnetic characteristics and high durability by setting the average thickness of an upper magnetic layer at 0.01 to 0.3 $\mu$m to control the fluctuation at interface between a magnetic layer and a nonmagnetic layer so that (standard deviation of a magnetic layer thickness)/(average magnetic layer thickness) becomes within the range of 0.05 to 0.5. However, there is a limit in wet-on-wet coating adopted by the same patent to obtain the magnetic recording medium to suppress the interfacial fluctuation between a magnetic layer and a nonmagnetic layer, and when a magnetic layer is further thinned, the fluctuation at interface unfavorably causes noises. In addition, the laminated Sendust head as used in the patent is an inductive head, but an MR head for use in higher density recording in the future is more susceptible to the influence of a medium noise, hence the interfacial fluctuation will be actualized.

JP-A-2000-173038 ensures high electromagnetic characteristics and high durability by setting the thickness of a magnetic layer at 0.05 to 0.5 $\mu$m and adding diamond particles having an average particle size of from 0.05 to 1.0 $\mu$m to the magnetic layer in proportion of from 0.1 to 5 mass % (i.e., weight %) based on the amount of the ferromagnetic metal powder. However, the layer thickness in the Examples of the above patent is mainly restricted to 0.3 $\mu$m, and it is necessary to make magnetic layer thickness thinner for achieving higher density. Further, the layer thickness of about 0.3 $\mu$m is not liable to be influenced by the interface between a magnetic layer and a nonmagnetic layer, and S/N ratio does not deteriorate even by wet-on-wet coating.

The evaluation of the magnetic recording media disclosed in these patents was performed by recording and reproducing using an MIG (metal-in-gap) head which is an inductive type magnetic head and track density is relatively low, and when higher density recording is done by further lessening a track width or thinning the magnetic layer thickness, a sufficient S/N ratio cannot be obtained at reproduction. In particular, the influence of interfacial fluctuation becomes large when an MR head is used, which causes the degradation of S/N ratio.

A low noise and high density magnetic recording medium and also excellent in running durability is desired even when a conventionally used coating-type magnetic recording medium which is excellent in productivity and inexpensive is combined with an MR head.

SUMMARY OF THE INVENTION

An object of the present invention is to provide a magnetic recording medium which is excellent in electromagnetic characteristics and is optimal for digital recording.

The present invention provides a magnetic recording medium comprising a support having provided thereon a substantially nonmagnetic lower layer by coating a lower layer coating solution comprising a nonmagnetic powder dispersed in a binder and drying, and a magnetic layer having a thickness of from 0.01 to 0.15 $\mu$m by coating a magnetic layer coating solution comprising a ferromagnetic metal powder or a hexagonal ferrite powder dispersed in a binder, wherein the magnetic layer contains diamond particles having an average particle size of from 1/5 to 2 times the thickness of the magnetic layer in an amount of from 0.1 to 5.0 mass % (i.e., weight %) based on the amount of the ferromagnetic powder.

The preferred embodiments of the present invention are as follows.

(1) The magnetic recording medium, wherein the lower layer has an average surface roughness of 20 nm or less.

(2) The magnetic recording medium which is for reproduction using an MR head.

DETAILED DESCRIPTION OF THE INVENTION

The present invention relates to a magnetic recording medium produced by wet-on-dry coating of providing a magnetic layer on a lower layer after the lower layer has been dried.

The magnetic layer in the present invention has a thickness preferably of from 0.01 to 0.15 µm, more preferably from 0.03 to 0.10 µm, a ferromagnetic metal powder or a hexagonal ferrite powder is contained in the magnetic layer as a ferromagnetic powder, and diamond particles having an average particle size of from 1/5 to 2 times the thickness of the magnetic layer are contained in the magnetic layer in an amount of from 0.1 to 5.0 mass % (i.e., weight %) based on the amount of the ferromagnetic powder.

The present invention can make the average surface roughness of a lower layer preferably 20 nm or less, more preferably 10 nm or less, can suppress the fluctuation at interface between a magnetic layer and a nonmagnetic layer, can improve the S/N ratio by reproduction with an MR head, and can ensure the running durability by specifying the particle size of the diamond particles, prescribing the magnetic layer thickness as thin as the above range, and adopting the wet-on-dry coating method.

The fluctuation at interface can be evaluated by electron ray micro-analysis (EPMA) as described in the Examples later.

In the present invention, when the magnetic layer contains diamond particles having an average particle size of less than 1/5 times the thickness of the magnetic layer in an amount of less than 0.1 mass % based on the amount of the ferromagnetic powder, running durability cannot be ensured. When the magnetic layer contains diamond particles having an average particle size of less than 1/5 times the thickness of the magnetic layer in an amount of more than 5.0 mass % based on the amount of the ferromagnetic powder, S/N ratio cannot be improved. When the magnetic layer contains diamond particles having an average particle size of more than 2 times the thickness of the magnetic layer in an amount of less than 0.1 mass % based on the amount of the ferromagnetic powder, S/N ratio and running durability cannot be improved. When the magnetic layer contains diamond particles having an average particle size of more than 2 times the thickness of the magnetic layer in an amount of more than 5.0 mass % based on the amount of the ferromagnetic powder, S/N ratio cannot be improved and running durability cannot be improved furthermore.

Further, it is difficult to make the thickness of a magnetic layer less than 0.01 µm in good yield according to the present techniques by adding diamond particles having an average particle size of from 1/5 to 2 times the thickness of the magnetic layer to the magnetic layer in an amount of from 0.1 to 5.0 mass % based on the amount of the ferromagnetic powder. Further, making the thickness of a magnetic layer more than 0.15 µm by adding diamond particles having an average particle size of from 1/5 to 2 times the thickness of the magnetic layer to the magnetic layer in an amount of from 0.1 to 5.0 mass % based on the amount of the ferromagnetic powder cannot improve S/N ratio due to self demagnetization loss.

The constitutional elements of the present invention are described in detail below.

Diamond Particles

Diamond particles for use in the present invention have an average particle size of from 1/5 to 2 times the thickness of the magnetic layer, preferably from 1/2 to 1.5 times, and more preferably from 0.8 to 1.2 times. The amount of addition of diamond particles is from 0.1 to 5.0 mass % based on the amount of the ferromagnetic powder, preferably from 0.5 to 3 mass %. When the addition amount is less than 0.1 mass %, running durability cannot be ensured, while when it is more than 5.0 mass %, S/N ratio lowers and head abrasion increases.

Diamond particles may be used in combination with alumina particles. The average particle size of alumina particles to be used in combination is from 0.05 to 0.5 µm, preferably from 0.1 to 0.3 µm. The addition amount of alumina particles is preferably from 1 to 30 mass % based on the amount of the ferromagnetic metal powders, more preferably from 3 to 15 mass %. When the addition amount of alumina particles is less than 1 mass %, running durability cannot be ensured, while when the amount is more than 30 mass %, S/N ratio lowers and head abrasion increases. In the present invention, diamond particles and alumina particles are added to the magnetic layer in a mass ratio of diamond/alumina of preferably from 1/0.5 to 1/30, more preferably from 1/1.5 to 1/20. Even if the amount of alumina is too little or too large in the above addition rate, the improving effect of running durability lowers. The largest particle size of diamond particles or alumina particles is taken as the particle size in the present invention, and the average value of the measured values of 500 particles sampled at random from electron microphotographs is taken as the average particle size.

With respect to particle size distribution of diamond particles, it is preferred that the number of particles having the particle size of 200% or more of the average particle size accounts for 5% or less of the entire number of diamond particles, and the number of particles having the particle size of 50% or less of the average particle size accounts for 20% or less of the entire number of diamond particles. The maximum value of the particle size of the diamond particles for use in the present invention is about 0.8 µm, preferably about 0.4 µm, and the minimum value is about 0.005 µm, preferably about 0.01 µm.

Particle size distribution is obtained by counting the numbers of respective sizes based on the average particle size at the measurement of particle sizes. Particle size distribution of diamond particles also influences running durability, noise and head abrasion. If the particle size distribution is broader than the above-described range, the effects as described above deviate, i.e., when too large particle sizes predominate in the particle size distribution, head abrasion increases in some cases. While when too small particle sizes predominate, the improving effect of running durability sometimes lowers. Further, diamond particles having extremely narrow particle size distribution are expensive, hence the above-described range is economically advantageous as well. The amount of abrasives can be largely decreased due to the combined use with an alumina, which is not only advantageous from the viewpoint of the improvement of S/N ratio but also advantageous in that the design of a magnetic disc can be performed as desired, e.g., running durability is prior to S/N ratio and vice versa, making good use of relatively wide range of the addition amount of an alumina.

Magnetic Layer

The magnetic recording medium according to the present invention may be provided with a magnetic layer on either one side of a support or may be provided on both sides.

The magnetic layer provided on one side of a support may be a monolayer or multilayers comprising different compositions from each other. In the present invention, a substantially nonmagnetic lower layer (a nonmagnetic layer or a lower layer) is provided between the magnetic layer and a support by wet-on-dry coating. The magnetic layer is called an upper layer or an upper magnetic layer.

Ferromagnetic Metal Powder

The ferromagnetic metal powders for use in the present invention are preferably ferromagnetic metal powders mainly comprising α-Fe as a main component. These ferromagnetic metal powders may contain, in addition to the prescribed atoms, the following atoms, e.g., Al, Si, Ca, Mg, Ti, Cr, Cu, Y, Sn, Sb, Ba, W, La, Ce, Pr, Nd, P, Co, Mn, Zn, Ni, Sr and B. In particular, it is preferred to contain at least one of Al, Ca, Mg, Y, Ba, La, Nd, Sm, Co and Ni, in addition to α-Fe. The alloy of Co with Fe is particularly preferred to increase saturation magnetization and improve demagnetization. The content of Co is preferably from 1 to 40 atomic %, more preferably from 15 to 35 atomic %, and most preferably from 20 to 35 atomic %, the content of rare earth elements such as Y is preferably from 1.5 to 12 atomic %, more preferably from 3 to 10 atomic %, and most preferably from 4 to 9 atomic %, and the content of Al is preferably from 1.5 to 12 atomic %, more preferably from 3 to 10 atomic %, and most preferably from 4 to 9 atomic %, each based on Fe. Rare earth including Y and Al function as a sintering preventing agent, and a higher sintering preventing effect can be obtained when they are used in combination. These ferromagnetic powders may be previously treated with the later-described dispersants, lubricants, surfactants and antistatic agents before dispersion. Specifically, the examples are disclosed in JP-B-44-14090 (the term "JP-B" as used herein means an "examined Japanese patent publication"), JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. Nos. 3,026,215, 3,031,341, 3,100,194, 3,242,005 and 3,389,014.

The ferromagnetic metal powders may contain a small amount of a hydroxide or an oxide. Ferromagnetic metal powders prepared by well-known methods can be used, such as a method of reducing a moisture-containing iron oxide having been subjected to sintering inhibiting treatment or an iron oxide with a reducing gas, e.g., hydrogen, to thereby obtain Fe or Fe—Co particles; a method of reducing a composite organic acid salt (mainly an oxalate) with a reducing gas, e.g., hydrogen; a method of heat-decomposing a metal carbonyl compound; a method of adding to an aqueous ferromagnetic metal solution a reducing agent, e.g., sodium boron hydride, hypophosphite or hydrazine, to effect reduction; and a method of evaporating a metal in a low pressure inert gas to obtain a powder. The thus-obtained ferromagnetic metal powders are subjected to well-known gradual oxidation treatment. A method of forming oxide films on the surfaces of ferromagnetic metal powders by reducing a moisture-containing iron oxide or an iron oxide with a reducing gas, e.g., hydrogen, and regulating partial pressures of an oxygen-containing gas and an inert gas, temperature and time is less in demagnetization and preferably used in the present invention.

The ferromagnetic metal powders for use in the magnetic layer in the present invention have a specific surface area ($S_{BET}$) as measured by the BET method of from 40 to 80 $m^2/g$, preferably from 45 to 70 $m^2/g$. When $S_{BET}$ is less than 40 $m^2/g$, noise increases, and when more than 80 $m^2/g$, a smooth surface is obtained with difficulty, which is not preferred. The ferromagnetic metal powders for use in the magnetic layer according to the present invention have a crystallite size of generally from 80 to 180 Å, preferably from 100 to 170 Å, and more preferably from 110 to 165 Å. The average long axis length of the ferromagnetic metal powders is generally from 0.02 to 0.25 $\mu$m, preferably from 0.03 to 0.15 $\mu$m, and more preferably from 0.03 to 0.12 $\mu$m. The ferromagnetic metal powders preferably have an average acicular ratio (the average of (long axis length/short axis length)) of from 3 to 15, more preferably from 3 to 10. The ferromagnetic metal powders have a saturation magnetization ($\sigma_s$) of generally from 90 to 170 A·$m^2$/kg, preferably from 100 to 160 A·$m^2$/kg, and more preferably from 110 to 160 A·$m^2$/kg. The ferromagnetic metal powders have a coercive force of preferably from 135 to 279 kA/m, and more preferably from 143 to 239 kA/m.

The ferromagnetic metal powders preferably have a moisture content of from 0.1 to 2 mass %. The moisture content of the ferromagnetic metal powders is preferably optimized by selecting the kinds of binders. The pH of the ferromagnetic metal powders is preferably optimized by the combination with the binder to be used. The pH range is from 6 to 12, preferably from 7 to 11. The SA (stearic acid) adsorption amount of the ferromagnetic metal powders (the standard of the basic point of the surface) is from 1 to 15 $\mu$mol/$m^2$, preferably from 2 to 10 $\mu$mol/$m^2$, and more preferably from 3 to 8 $\mu$mol/$m^2$. When ferromagnetic metal powders high in a stearic acid adsorption amount are used, it is preferred to manufacture a magnetic recording medium by modifying the surfaces of ferromagnetic metal powders with organic substances which are strongly adsorbed onto the surfaces thereof.

Soluble inorganic ions (e.g., Na, Ca, Fe, Ni, Sr, $NH_4$, $SO_4$, Cl, $NO_2$ and $NO_3$) are sometimes contained in the ferromagnetic metal powders. It is preferred that such soluble inorganic ions are substantially not contained, but the properties of ferromagnetic metal powders are not particularly affected if the total content of each ion is 300 ppm or less or so. The ferromagnetic metal powders for use in the present invention preferably have less voids and the value thereof is preferably 20% by volume or less, more preferably 5% by volume or less. The shape of the ferromagnetic metal powders is not particularly restricted, and any shape such as an acicular shape, an ellipsoidal shape and a spindle shape may be used so long as the above-described particle sizes and magnetic characteristics are satisfied. Switching field distribution (SFD) of the ferromagnetic metal powders themselves is preferably small. It is necessary to make Hc distribution of the ferromagnetic metal powders narrow. When the SFD of a tape is small, reversal of magnetization (i.e., magnetic flux revolution) becomes sharp and peak shift is small, which is, therefore, suitable for high density digital magnetic recording. For achieving small Hc distribution, making particle size distribution of goethite in the ferromagnetic metal powders good, using monodispersed α-$Fe_2O_3$, and preventing sintering among particles are effective methods.

Hexagonal Ferrite Powder

The examples of the hexagonal ferrite powders for use in the magnetic layer in the present invention include substitution products of barium ferrite, strontium ferrite, lead ferrite and calcium ferrite, and Co substitution products. Specifically, barium ferrite and strontium ferrite of magnetoplumbite type, magnetoplumbite type ferrite having covered the particle surfaces with spinel, and barium ferrite and strontium ferrite of magnetoplumbite type partially containing a spinel phase are exemplified. The hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, the hexagonal ferrite powders containing the following elements can be used, e.g., Co—Zn, Co—Ti, Co—Ti—Zr, Co—Ti—Zn, Ni—Ti—Zn, Nb—Zn—Co, Sb—Zn—Co, and Nb—Zn. According to starting materials and producing processes, specific impurities may be contained.

The average tabular diameter of the hexagonal ferrite powders for use in the present invention is generally from 10 to 50 nm, preferably from 10 to 40 nm, and particularly preferably from 10 to 35 nm, although it varies according to recording density. The tabular diameter used here means the longest hexagonal diameter of the base of a hexagonal pole of a hexagonal ferrite magnetic powder, and the average tabular diameter is the arithmetic mean of it.

When reproduction is performed using a magneto-resistance head particularly for increasing track density, it is necessary to reduce noise, accordingly the tabular diameter is preferably 35 nm or less, but when the tabular diameter is smaller than 10 nm, stable magnetization cannot be obtained due to thermal fluctuation. While when the tabular diameter exceeds 50 nm, noise increases, therefore, none of such tabular diameters are suitable for high density recording. A tabular ratio (tabular diameter/tabular thickness) is preferably from 1 to 15, more preferably from 1 to 7. When a tabular ratio is small, the packing density in a magnetic layer becomes high, which is preferred but sufficient orientation cannot be obtained. When a tabular ratio is more than 15, noise increases due to stacking among particles. The specific surface area ($S_{BET}$) measured by the BET method of the particles having diameters within this range is generally from 30 to 200 m$^2$/g. The specific surface areas nearly coincide with the values obtained by arithmetic operations from tabular diameters and tabular thicknesses. The distribution of tabular diameter/tabular thickness is in general preferably as narrow as possible. The distributions in numerical values can be compared by measuring TEM photographs of 500 particles selected randomly.

The distribution is in many cases not regular distribution, but when expressed by the standard deviation to the average diameter by computation, σ/average diameter is from 0.1 to 2.0. For obtaining narrow particle size distribution, it is efficient to make a particle-forming reaction system homogeneous to the utmost, particles formed are subjected to distribution-improving treatments as well. For example, a method of selectively dissolving ultrafine particles in an acid solution is also known. Coercive force (Hc) measured in magnetic powders of about 500 to about 5,000 Oe (=about 40 to 400 kA/m) can be produced. Higher Hc is advantageous for high density recording but it is restricted by the capacities of recording heads. Hc can be controlled by particle diameters (tabular diameter and tabular thickness), the kinds and amounts of elements contained, the substitution sites of elements, and the reaction conditions of particle formation. Saturation magnetization ($σ_s$) is from 30 to 80 A·m$^2$/kg. $σ_s$ has the inclination of becoming smaller as particles become finer. A method of reducing the crystallization temperature or heat treatment temperature and time, a method of increasing the amount of the compound to be added, or a method of increasing the surface treating amount can be used in manufacturing. A W-type hexagonal ferrite can also be used. Further, when magnetic powders are dispersed, the particle surfaces of the magnetic powders may be treated with substances compatible with the dispersion media and the polymers.

Inorganic or organic compounds are used as a surface treating agent. Oxides or hydroxides of Si, Al and P, various kinds of silane coupling agents, and various kinds of titanium coupling agents are the representatives of such a surface treating agent, for example. The amount of the surface treating agent is from 0.1 to 10% based on the amount of the magnetic powder. The pH of magnetic powders is also important for dispersion, and is in general from 4 to 12. The optimal value is dependent upon the dispersion medium and the polymer. Taking the chemical stability and the storage stability of the medium into consideration, pH of from about 6 to about 11 or so is selected. The water content in the magnetic powder also affects dispersion. The optimal value of the water content is dependent upon the dispersion medium and the polymer, and is generally from 0.01 to 2.0%. Hexagonal ferrite powders for use in the present invention are produced by any of (1) a glass crystallization method of mixing a metallic oxide which substitutes barium oxide, iron oxide and iron, and a boron oxide as a glass-forming material, so as to make a desired ferrite composition, melting and quenching to obtain an amorphous product, reheat-treating the obtained product, washing and then pulverizing, to thereby obtain a barium ferrite crystal powder, (2) a hydrothermal reaction method of neutralizing a solution of barium ferrite composition metal salt with an alkali, removing the byproducts, heating the liquid phase at 100° C. or more, washing, drying and pulverizing, to thereby obtain a barium ferrite crystal powder, and (3) a coprecipitation method of neutralizing a solution of barium ferrite composition metal salt with an alkali, removing the byproducts, drying, treating at 1,100° C. or less, and then pulverizing, to thereby obtain a barium ferrite crystal powder, and any of these methods can be used in the present invention.

Lower Layer

The lower layer is described in detail below. The lower layer preferably comprises a nonmagnetic inorganic powder and a binder as main components. The nonmagnetic inorganic powder for use in the lower layer can be selected from inorganic compounds, e.g., metallic oxide, metallic carbonate, metallic sulfate, metallic nitride, metallic carbide and metallic sulfide. The examples of inorganic compounds are selected from the following compounds and they can be used alone or in combination, e.g., α-alumina having an alpha-conversion rate of 90% or more, β-alumina, γ-alumina, θ-alumina, silicon carbide, chromium oxide, cerium oxide, α-ironoxide, hematite, goethite, corundum, siliconnitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred because they have small particle size distribution and various means for imparting functions, and titanium dioxide and α-iron oxide are more preferred. These nonmagnetic inorganic powders preferably have an average particle size of from 0.005 to 2 μm. If necessary, a plurality of nonmagnetic inorganic powders each having a different particle size may be combined, or a single nonmagnetic inorganic powder may have broad particle size distribution so as to attain the same effect as such a combination. These nonmagnetic inorganic powders particularly preferably have an average particle size of from 0.01 to 0.2 μm. In particular, when the nonmagnetic inorganic powder is a granular metallic oxide, the average particle size thereof is preferably 0.08 μm or less, and when the nonmagnetic inorganic powder is an acicular metallic oxide, the average long axis length thereof is preferably 0.3 μm or less, more preferably 0.2 μm or less. The Nonmagnetic inorganic powders for use in the present invention have a tap density of generally from 0.05 to 2 g/ml, preferably from 0.2 to 1.5 g/ml; a water content of generally from 0.1 to 5 mass %, preferably from 0.2 to 3 mass %, and more preferably from 0.3 to 1.5 mass %; a pH value of generally from 2 to 11, and particularly preferably between 5.5 and 10; a specific surface area ($S_{BET}$) of generally from 1 to 100 m$^2$/g, preferably from 5 to 80 m$^2$/g, and more preferably from 10 to 70 m$^2$/g.

The Nonmagnetic inorganic powders for use in the present invention have a crystallite size of preferably from 0.004 to 1 μm, and more preferably from 0.04 to 0.1 μm; an oil absorption amount using DBP (dibutyl phthalate) of generally from 5 to 100 ml/100 g, preferably from 10 to 80 ml/100 g, and more preferably from 20 to 60 ml/100 g; and a specific gravity of generally from 1 to 12, and preferably from 3 to 6. The shape of the nonmagnetic inorganic powders may be any of an acicular, spherical, polyhedral, or tabular shape. The nonmagnetic inorganic powders preferably have a Mohs' hardness of from 4 to 10. The SA (stearic acid) adsorption amount of the nonmagnetic inorganic powders is from 1 to 20 μmol/m$^2$, preferably from 2 to 15 μmol/m$^2$, and more preferably from 3 to 8 μmol/m$^2$. The pH of the nonmagnetic inorganic powders is preferably between 3 and 6. The surfaces of these nonmagnetic inorganic powders can be covered with $Al_2O_3$, $SiO_2$, $TiO_2$, $ZrO_2$, $SnO_2$, $Sb_2O_3$, ZnO or $Y_2O_3$. $Al_2O_3$, $SiO_2$, $TiO_2$ and $ZrO_2$ are particularly preferred in the point of dispersibility, and $Al_2O_3$, $SiO_2$ and $ZrO_2$ are more preferred. They can be used in combination or may be used alone. According to purpose, a layer subjected to surface treatment by coprecipitation may be used. Alternatively, surface treatment of particles may be previously performed to be covered with alumina in the first place, then the alumina-covered surface is covered with silica, or vice versa, according to purposes. The surface-covered layer may be porous layer, if necessary, but a homogeneous and dense surface is generally preferred.

The specific examples of the nonmagnetic inorganic powders for use in the lower layer in the present invention and the producing methods are disclosed in WO 98/35345.

By adding carbon blacks to the lower layer, a desired micro Vickers' hardness can be obtained, surface electrical resistance (Rs) and light transmittance can be reduced as well, as are well-known effects. It is also possible to bring about the effect of stocking a lubricant by adding carbon blacks to the lower layer. Furnace blacks for rubbers, thermal blacks for rubbers, carbon blacks for coloring and acetylene blacks can be used as carbon blacks. Carbon blacks for use in the lower layer should optimize the following characteristics by the desired effects and further effects can be obtained by the combined use in some cases.

Carbon blacks for use in the lower layer according to the present invention have a specific surface area ($S_{BET}$) of generally from 100 to 500 m$^2$/g, preferably from 150 to 400 m$^2$/g, a DBP oil absorption amount of generally from 20 to 400 ml/100 g, preferably from 30 to 400 ml/100 g, an average particle size of generally from 5 to 80 nm, preferably from 10 to 50 nm, and more preferably from 10 to 40 nm, and a small amount of carbon blacks having an average particle size of larger than 80 nm may be contained in the lower layer. Carbon blacks for use in the lower layer have pH of from 2 to 10, a water content of from 0.1 to 10%, and a tap density of from 0.1 to 1 g/ml.

The specific examples of the carbon blacks for use in the lower layer in the present invention are disclosed in WO 98/35345. Carbon blacks can be used within the range not exceeding 50 mass % of the above nonmagnetic inorganic powders (exclusive of carbon blacks) and not exceeding 40% of the total mass of the nonmagnetic layer. These carbon blacks can be used alone or in combination. With respect to the carbon blacks which can be used in the present invention, e.g., the disclosure in *Carbon Black Binran* (*Handbook of Carbon Blacks*), compiled by Carbon Black Kyokai can be referred to.

Organic powders can be used in the lower layer according to purposes. The examples of organic powders include an acryl styrene resin powder, a benzoguanamine resin powder, a melamine resin powder, and a phthalocyanine pigment. In addition, a polyolefin resin powder, a polyester resin powder, a polyamide resin powder, apolyimide resin powder, and a polyethylene fluoride resin powder can also be used. The producing methods of these organic powders are disclosed in JP-A-62-18564 and JP-A-60-255827.

The binder resins, lubricants, dispersants, additives, solvents, dispersing methods, and others used for the magnetic layer described below can be used in the lower layer and the backing layer described later. In particular, with respect to the amounts and the kinds of binder resins, additives, the amounts and the kinds of dispersants, well-known prior art techniques regarding the magnetic layer can be applied to the lower layer.

Binder

Conventionally well-known thermoplastic resins, thermosetting resins, reactive resins and mixtures of these resins are used as a binder in the present invention.

Thermoplastic resins having a glass transition temperature of from −100 to 150° C., a number average molecular weight of from 1,000 to 200,000, preferably from 10,000 to 100,000, and a polymerization degree of from about 50 to about 1,000 can be used in the present invention.

The examples of thermoplastic resins include polymers or copolymers containing, as the constituting unit, vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal or vinyl ether; polyurethane resins and various rubber resins. The examples of thermosetting resins and reactive resins include phenolic resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. These resins are described in detail in *Plastic Handbook*, Asakura Shoten. It is also possible to use well-known electron beam-curable type resins in each layer. The examples of these resins and producing methods are disclosed in detail in JP-A-62-256219. These resins can be used alone or may be used in combination. The examples of preferred combinations include at least one resin selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, and combinations of these resins with polyisocyanate.

As the polyurethane resins, those having well-known structures, e.g., polyester polyurethane, polyether polyurethane, polyether polyester polyurethane, polycarbonate polyurethane, polyester polycarbonate polyurethane, and polycaprolactone polyurethane can be used. For the purpose of further improving the dispersibility and the durability, it is referred that at least one polar group selected from the following is introduced by copolymerization or addition reaction, with respect to all the binders described above, e.g., —COOM, —SO$_3$M, —OSO$_3$M, —P=O(OM)$_2$, —O—P=O(OM)$_2$ (wherein M represents a hydrogen atom or an alkali metal salt group), —NR$_2$, —N$^+$R$_3$ (R represents a hydrocarbon group), an epoxy group, —SH, and —CN. The content of the polar group is from $10^{-1}$ to $10^{-8}$ mol/g, preferably from $10^{-2}$ to $10^{-6}$ mol/g. It is preferred that polyurethane resins have at least one OH group at each terminal of a polyurethane molecule, i.e., two or more in total, besides the above polar groups. As OH groups form three dimensional network structure by crosslinking with a polyisocyanate curing agent, they are preferably contained in a molecule as many as possible. In particular, it is preferred that OH groups are present at terminals of a molecule, since the reactivity with the curing agent becomes high. It is preferred for polyurethane to have 3 or more OH groups, particularly preferably 4 or more OH groups, at terminals of a molecule. When polyurethane is used in the present invention, the polyurethane has a glass transition temperature of generally from –50 to 150° C., preferably from 0 to 100° C., and particularly preferably from 30 to 100° C., breaking extension of from 100 to 2,000%, breaking stress of generally from 0.05 to 10 kg/mm$^2$ (=about 0.49 to 98 MPa), and a yielding point of from 0.05 to 10 kg/mm$^2$ (=about 0.49 to 98 MPa). Due to these physical properties, a coated film having good mechanical properties can be obtained.

The specific examples of the binders for use in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.) as vinyl chloride copolymers; Nippollan N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Chemicals and Ink. Co., Ltd.), Vylon UR8200, UR8300, UR8700, RV530 and RV280 (manufactured by Toyobo Co., Ltd.), polycarbonate polyurethane, Daipheramine 4020, 5020, 5100, 5300, 9020, 9022 and 7020 (manufactured by Dainichi Seika K. K.), polyurethane, MX5004 (manufactured by Mitsubishi Kasei Corp.), polyurethane, Sunprene SP-150 (manufactured by Sanyo Chemical Industries Co. Ltd.), polyurethane, Salan F310 and F210 (manufactured by Asahi Chemical Industry Co., Ltd.) as polyurethane resins, etc.

The amount of the binder for use in the nonmagnetic layer and the magnetic layer in the present invention is from 5 to 50 mass % (i.e., weight %), preferably from 10 to 30 mass %, based on the weight of the nonmagnetic inorganic powder and the magnetic powder respectively. When vinyl chloride resins are used, the amount thereof is from 5 to 30 mass %, when polyurethane resins are used, the amount thereof is from 2 to 20 mass %, and it is preferred that polyisocyanate is used in an amount of from 2 to 20 mass % in combination with these resins, however, for instance, when the corrosion of a head is caused by a slight amount of chlorine due to dechlorination, it is possible to use polyurethane alone or a combination of polyurethane and isocyanate alone.

The magnetic recording medium in the present invention comprise two or more layers. Accordingly, the amount of the binder, the amounts of the vinyl chloride resin, polyurethane resin, polyisocyanate or other resins contained in the binder, the molecular weight of each resin constituting the magnetic layer, the amount of polar groups, or the above-described physical properties of resins can of course be varied in the nonmagnetic layer and the magnetic layer according to necessity. These factors should be rather optimized in respective layers. Well-known techniques with respect to multilayer magnetic layers can be used in the present invention. For example, when the amount of the binder is varied in each layer, it is effective to increase the amount of the binder contained in the magnetic layer to reduce scratches on the surface of the magnetic layer. For improving the head touch against the head, it is effective to increase the amount of the binder in the nonmagnetic layer to impart flexibility.

The examples of the polyisocyanates for use in the present invention include isocyanates, e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate, and triphenylmethanetriisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone or in combinations of two or more thereof in each layer, taking advantage of a difference in curing reactivity.

Carbon Black, Abrasive

The carbon blacks for use in the magnetic layer according to the present invention include furnace blacks for rubbers, thermal blacks for rubbers, carbon blacks for coloring, and acetylene blacks. Carbon blacks for use in the magnetic layer of the present invention preferably have a specific surface area ($S_{BET}$) of from 5 to 500 m$^2$/g, a DBP oil absorption amount of from 10 to 400 ml/100 g, an average particle size of from 5 to 300 nm, pH of from 2 to 10, a water content of from 0.1 to 10%, and a tap density of from 0.1 to 1 g/ml. The specific examples of the carbon blacks for use in the magnetic layer of the present invention are disclosed in WO 98/35345.

Carbon blacks can serve various functions such as prevention of static charges of the magnetic layer, reduction of a friction coefficient, impartation of a light-shielding property and improvement of film strength. Such functions vary depending upon the kind of carbon blacks to be used. Accordingly, when the present invention takes a multilayer structure, it is of course possible to select and determine the kinds, the amounts and the combinations of the carbon blacks to be added to each layer on the basis of the above-described various properties such as the particle size, the oil absorption amount, the electroconductivity and the pH value, or these should be rather optimized in respective layers.

Abrasives other than diamond particles can be used in combination in the magnetic layer and other layers according to the present invention. Well-known materials essentially having a Mohs' hardness of 6 or more are used alone or in combination as the abrasive in the magnetic layer according to the present invention. The examples of such abrasives include α-alumina having an alpha-conversion rate of 90% or more, β-alumina, silicon carbide, chromium oxide, cerium oxide, α-iron oxide, corundum, silicon nitride, silicon carbide, titanium carbide, titanium oxide, silicon dioxide, and boron nitride. The composites composed of these abrasives (abrasives obtained by surface-treating with other abrasives) may also be used. Compounds or elements other than the main component are often contained in the abrasives, but the intended effect can be attained so far as the content of the main component is 90% or more. The abrasives preferably have an average particle size of from 0.01 to 2 μm and, in particular, for improving electromagnetic characteristics, it is preferred to use abrasives having narrow particle size distribution. For improving durability, abrasives each having a different particle size may be combined according to necessity, or a single abrasive having a broad particle size distribution may be used so as to attain the same effect as such a combination. Preferably, the abrasives for use in the present invention have a tap density of from 0.3 to 2 g/ml, a water content of from 0.1 to 5%, a pH value of from 2 to 11, and a specific surface area ($S_{BET}$) of from 1 to 30 m$^2$/g. The shape of the abrasives for use in the present invention may be any of acicular, spherical and die-like shapes. Abrasives having a shape partly with edges are referred, because a high abrasive property can be obtained. The specific examples of the abrasives for use in the magnetic layer of the present invention are disclosed in WO 98/35345. The particle size and the amount of the abrasive to be added to the magnetic layer and the nonmagnetic layer should be selected at optimal values independently.

Additive

As the additives for use in the magnetic layer and the nonmagnetic layer of the present invention, those having a lubricating effect, an antistatic effect, a dispersing effect and a plasticizing effect are used, and comprehensive improvement of capacities can be contrived by combining the additives. As the additives having a lubricating effect, lubricants remarkably act on cohesion caused by the friction of surfaces of materials with each other are used. Lubricants are classified into two types. Lubricants which are used for a magnetic recording medium cannot be judged completely whether they show fluid lubrication or boundary lubrication, but according to general concepts they are classified into higher fatty acid esters, liquid paraffins and silicon derivatives which show fluid lubrication, and long chain fatty acids, fluorine surfactants and fluorine-containing high polymers which show boundary lubrication. In a coating type magnetic recording medium (i.e., a magnetic recording particulate medium), lubricants exist in a state dissolved in a binder or in a state partly adsorbed onto the surface of a ferromagnetic powder, and they migrate to the surface of a magnetic layer. The speed of migration depends upon whether the compatibility of a binder and a lubricant is good or bad. The speed of migration is slow when the compatibility of a binder and a lubricant is good and the migration speed is fast when the compatibility is bad. As one idea as to good or bad of the compatibility, there is a means of comparison of dissolution parameters of a binder and a lubricant. A nonpolar lubricant is effective for fluid lubrication and a polar lubricant is effective for boundary lubrication.

In the present invention, it is preferred to use a higher fatty acid ester showing fluid lubrication and a long chain fatty acid showing boundary lubrication each having different characteristics in combination, and it is more preferred to combine at least three of these lubricants. Solid lubricants can also be used in combination with these lubricants.

The examples of the solid lubricants which can be used in combination include molybdenum disulfide, tungsten graphite disulfide, boron nitride, and graphite fluoride. The examples of the long chain fatty acids showing boundary lubrication include monobasic fatty acids having from 10 to 24 carbon atoms (which may contain an unsaturated bond or may be branched) and metal salts of these monobasic fatty acids (e.g., with Li, Na, K or Cu). The examples of the fluorine surfactants and fluorine-containing high polymers include fluorine-containing silicones, fluorine-containing alcohols, fluorine-containing esters, fluorine-containing alkyl sulfates and alkali metal salts of them. The examples of the higher fatty acid esters showing fluid lubrication include basic fatty acid monoesters, fatty acid diesters or fatty acid triesters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), and fatty acid esters of monoalkyl ethers of alkylene oxide polymers. In addition to the above, the examples further include liquid paraffins, and as the silicon derivatives, silicone oils, e.g., dialkylpolysiloxane (the alkyl group has from 1 to 5 carbon atoms), dialkoxypolysiloxane (the alkoxy group has from 1 to 4 carbon atoms), monoalkylmonoalkoxypolysiloxane (the alkyl group has from 1 to 5 carbon atoms and the alkoxy group has from 1 to 4 carbon atoms), phenylpolysiloxane, and fluoroalkylpolysiloxane (the alkyl group has from 1 to 5 carbon atoms), silicones having a polar group, fatty acid-modified silicones, and fluorine-containing silicones.

The examples of other lubricants which can be used in the present invention include alcohols such as mono-, di-, tri-, tetra-, penta- or hexa-alcohols having from 12 to 22 carbon atoms (which may contain an unsaturated bond or may be branched), alkoxy alcohols having from 12 to 22 carbon atoms (which may contain an unsaturated bond or may be branched), and fluorine-containing alcohols, polyethylene waxes, polyolefins such as polypropylenes, ethylene glycols, polyglycols such as polyethylene oxide waxes, alkyl phosphates and alkali metal salts of alkyl phosphates, alkyl sulfates and alkali metal salts of alkyl sulfates, polyphenyl ethers, fatty acid amides having from 8 to 22 carbon atoms, and aliphatic amines having from 8 to 22 carbon atoms.

The examples of the additives having an antistatic effect, a dispersing effect and a plasticizing effect which can be used in the present invention include phenylphosphonic acids, specifically "PPA" (manufactured by Nissan Chemical Industries, Ltd.), etc., α-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfates and alkali metal salts thereof.

The lubricants particularly preferably used in the present invention are fatty acids and fatty acid esters, and the specific are disclosed in WO 98/35345. Besides the above, other different lubricants and additives can be used in combination as well.

Additionally, nonionic surfactants, e.g., alkylene oxides, glycerols, glycidols and alkylphenol-ethylene oxide adducts; cationic surfactants, e. g. , cyclic amines, ester amides, quaternary ammonium salts, hydantoin derivatives, heterocyclic compounds, phosphoniums and sulfoniums; anionic surfactants containing an acidic group, e.g., carboxylic acid, sulfonic acid, phosphoric acid, sulfuric acid ester groups or phosphoric acid ester groups; and amphoteric surfactants, e.g., amino acids, aminosulfonic acids, sulfates or phosphates of amino alcohols, and alkylbetains can also be used. These surfactants are described in detail in *Kaimen Kasseizai Binran* (*Handbook of Surfactants*) (published by Sangyo Tosho Co., Ltd.). These lubricants and antistatic agents need not be 100% pure and may contain impurities such as isomers, non-reacted products, byproducts, decomposed products and oxides, in addition to the main component. However, the content of such impurities is preferably 30% or less, more preferably 10% or less.

As described in WO 98/35345, it is also preferred to use a monoester and a diester in combination as the fatty acid ester.

The surface of the magnetic layer of the magnetic recording medium in the present invention, in particular, the disc-like magnetic recording medium, has a C/Fe peak ratio of preferably from 5 to 100, particularly preferably from 5 to 80, when measured by the Auger electron spectroscopy. The measuring condition of the C/Fe peak ratio by the Auger electron spectroscopy is as follows.

Apparatus: Model PHI-660 manufactured by φ Co.
Measuring condition:
  Primary electron beam accelerating voltage: 3 KV
  Electric current of sample: 130 nA
  Magnification: 250-fold
  Inclination angle: 30°

The value of C/Fe peak is obtained as the C/Fe ratio by integrating the values obtained under the above conditions in the region of kinetic energy of 130 eV to 730 eV three times and finding the strengths of KLL peak of the carbon and LMM peak of the iron as differentials.

The amount of the lubricants contained in each of the upper layer and the lower layer of the magnetic recording medium according to the present invention is preferably from 5 to 30 mass parts per 100 mass parts of the ferromagnetic powder or the nonmagnetic inorganic powder.

The lubricants and surfactants for use in the present invention respectively have different physical functions. The kinds, amounts and proportions of generating synergistic effect of these lubricants should be determined optimally in accordance with the purpose. The nonmagnetic layer and the magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amount of the surfactant is controlled so as to improve the coating stability, or the amount of the lubricant in the intermediate layer is made larger so as to improve the lubricating effect. The examples are by no means limited there to. In general, the total amount of the lubricants is from 0.1 to 50 mass %, preferably from 2 to 25 mass %, based on the amount of the magnetic powder or the nonmagnetic inorganic powder.

All or a part of the additives to be used in the present invention may be added to the magnetic coating solution or the nonmagnetic coating solution in any step of the preparation. For example, the additives may be blended with the magnetic powder before the kneading step, may be added in the step of kneading the magnetic powder, the binder and the solvent, may be added in the dispersing step, may be added after the dispersing step, or may be added just before coating. According to the purpose, there is the case of capable of attaining the object by coating all or a part of the additives simultaneously with or successively after the coating of the magnetic layer. According to the purpose, the lubricants may be coated on the surface of the magnetic layer after calendering treatment or after completion of slitting.

Layer Structure

The thickness of the support of the magnetic recording medium in the present invention is generally from 2 to 100 μm, preferably from 2 to 80 μm. The thickness of the support of a computer tape is from 3.0 to 6.5 μm, preferably from 3.0 to 6.0 μm, and more preferably from 4.0 to 5.5 μm.

An undercoating layer may be provided between the support, preferably the nonmagnetic flexible support, and the nonmagnetic or magnetic layer for adhesion improvement. The thickness of the undercoating layer is from 0.01 to 0.5 μm, preferably from 0.02 to 0.5 μm.

A backing layer may be provided on the side of the support opposite to the side having the magnetic layer for the purpose of providing static charge prevention and curling correction. The thickness of the backing layer is generally from 0.1 to 4 μm, preferably from 0.3 to 2.0 μm. Well-known undercoating layers and backing layers can be used for this purpose.

The thickness of the magnetic layer of the constitution comprising the lower layer and the upper layer in the present invention is as described above and is optimized according to the saturation magnetization amount of the head to be used, the head gap length, and the recording signal zone. The thickness of the lower layer is generally from 0.2 to 5.0 μm, preferably from 0.3 to 3.0 μm, and more preferably from 1.0 to 2.5 μm.

The lower layer exhibits the effect of the present invention so long as it is substantially a nonmagnetic layer even if, or intendedly, it contains a small amount of a magnetic powder as an impurity, which is as a matter of course regarded as essentially the same constitution as in the present invention. The term "substantially a nonmagnetic layer" means that the residual magnetic flux density of the lower layer is 10 mT or less or the coercive force of the lower layer is 100 Oe (=about 8 kA/m) or less, preferably the residual magnetic flux density and the coercive force are zero. When the lower layer contains a magnetic powder, the content of the magnetic layer is preferably less than 1/2 of the entire inorganic powder contained in the lower layer. As the lower layer, a soft magnetic layer containing a soft magnetic powder and a binder may be formed in place of the nonmagnetic layer. The thickness of the soft magnetic layer is the same as the thickness of the lower layer described above.

Backing Layer

The magnetic recording medium in the present invention can be provided with a backing layer. A magnetic disc may also be provided with a backing layer, however, in general, a magnetic tape for a computer data recording is decidedly required to have an excellent repeating-running property as compared with a video tape and an audio tape. It is preferred for the backing layer to contain a carbon black and an inorganic powder for maintaining such a high running durability.

It is preferred to use two kinds of carbon blacks each having different average particle size in combination. In such a case, a fine carbon black having an average particle size of from 10 to 20 nm and a coarse carbon black having an average particle size of from 230 to 300 nm are preferably used in combination. In general, by the addition of a fine carbon black as above, the surface electrical resistance of the backing layer can be set at a low value and light transmittance can also be set at a low value. Since there are many kinds of magnetic recording apparatus making use of light transmittance of a tape to make it as a signal of operation, addition of fine carbon blacks is particularly effective in such a case. Further, fine carbon blacks are in general excellent in retention of a liquid lubricant and contribute to the reduction of a friction coefficient when a lubricant is used in combination. On the other hand, coarse carbon blacks having an average particle size of from 230 to 300 nm have a function as a solid lubricant and form minute protrusions on the surface of the backing layer to reduce the contact area and contribute to the reduction of a friction coefficient.

When commercially available products are used as the fine carbon blacks and coarse carbon blacks which can be used in the present invention, those disclosed in WO 98/35345 can be exemplified as the specific examples.

When two kinds of carbon blacks each having different average particle size are used in combination in the backing layer, the proportion of the contents (by mass (i.e., by weight)) of a fine carbon black having a particle size of from 10 to 20 nm and a coarse carbon black having a particle size of from 230 to 300 nm is preferably the former/the latter of from 98/2 to 75/25, more preferably from 95/5 to 85/15.

The content of the carbon black in the backing layer (the total amount when two kinds of carbon blacks are used) is generally from 30 to 80 mass parts (i.e., weight parts), preferably from 45 to 65 mass parts, per 100 mass parts of the binder.

It is preferred to use two kinds of inorganic powders each having different hardness.

Specifically, a soft inorganic powder having a Mohs' hardness of from 3 to 4.5 and a hard inorganic powder having a Mohs' hardness of from 5 to 9 are preferably used in combination.

By the addition of a soft inorganic powder having a Mohs' hardness of from 3 to 4.5, a friction coefficient can be stabilized against repeating-running. Moreover, a sliding guide pole is not scratched off with the hardness within this range. The average particle size of such a soft inorganic powder is preferably from 30 to 50 nm.

The examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. These soft inorganic powders can be used alone or in combination of two or more.

The content of the soft inorganic powder in a backing layer is preferably from 10 to 140 mass parts, more preferably from 35 to 100 mass parts, per 100 mass parts of the carbon black.

By the addition of a hard inorganic powder having a Mohs' hardness of from 5 to 9, the strength of a backing layer is increased and running durability is improved. When such hard inorganic powders are used together with carbon blacks and the above-described soft inorganic powders, deterioration due to repeating sliding is reduced and strong backing layer can be obtained. Appropriate abrasive property is given to the backing layer by the addition of the hard inorganic powder and the adhesion of scratched powders to a tape guide pole is reduced. In particular, when the hard inorganic powder is used in combination with a soft inorganic powder, sliding characteristics against a guide pole having a rough surface is improved and the stabilization of a friction coefficient of the backing layer can also be brought about.

The average particle size of hard inorganic powders is preferably from 80 to 250 nm, more preferably from 100 to 210 nm.

The examples of hard inorganic powders having a Mohs' hardness of from 5 to 9 include, e.g., α-iron oxide, α-alumina, and chromium oxide ($Cr_2O_3$). These powders may be used alone or in combination. Of the above hard inorganic powders, α-iron oxide and α-alumina are preferred. The content of hard inorganic powders in the backing layer is generally from 3 to 30 mass parts, preferably from 3 to 20 mass parts, per 100 mass parts of the carbon black.

When the above soft inorganic powder and hard inorganic powder are used in combination in the backing layer, it is preferred to use them selectively so that the difference of hardness between soft and hard inorganic powders is 2 or more, more preferably 2.5 or more, and particularly preferably 3 or more.

It is preferred that the above-described two kinds of inorganic powders each having a specific average particle size and different in Mohs' hardness and the above-described two kinds of carbon blacks each having a different average particle size are contained in the backing layer.

The backing layer may contain a lubricant. The lubricant can be arbitrarily selected from among those which can be used in the magnetic layer or the nonmagnetic layer as described above. The content of the lubricant in the backing layer is generally from 1 to 5 mass parts per 100 mass parts of the binder.

Support

The supports which are used in the present invention are preferably nonmagnetic flexible supports, and essentially have a thermal shrinkage factor of preferably 0.5% or less at 100° C. for 30 minutes, and preferably 0.5% or less at 80° C. for 30 minutes, more preferably 0.2% or less, in every direction of in-plane of the support. Moreover, the above-described thermal shrinkage factors of the supports at 100° C. for 30 minutes and at 80° C. for 30 minutes are preferably almost equal in every direction of in-plane of the support with difference of not more than 10%. The supports are preferably nonmagnetic supports. As the nonmagnetic supports which can be used in the present invention, well-known films such as polyesters (e.g., polyethylene terephthalate and polyethylene naphthalate), polyolefins, cellulose triacetate, polycarbonate, aromatic or aliphatic polyamide, polyimide, polyamideimide, polysulfone, and polybenzoxazole can be used. Highly strong supports such as polyethylene naphthalate and polyamide are preferably used. If necessary, a lamination type support as disclosed in JP-A-3-224127 can be used to vary the surface roughness of the magnetic layer surface and the base surface. These supports may be previously subjected to surface treatments, such as corona discharge treatment, plasma treatment, easy adhesion treatment, heat treatment, and dust removing treatment. Aluminum or glass substrate can also be used as a support in the present invention.

For attaining the object of the present invention, it is preferred to use a support having a central plane average surface roughness (Ra) of 4.0 nm or less, preferably 2.0 nm or less, measured by a surface roughness meter TOPO-3D (a product of WYKO Co.). It is preferred that the support not only has a small central plane average surface roughness but also is free from coarse protrusions having a height of 0.5 μm or more. Surface roughness configuration is freely controlled by the size and the amount of the fillers added to the support. The examples of such fillers include acryl-based organic powders, as well as oxides or carbonates of Ca, Si and Ti. The support for use in the present invention preferably has maximum height (Rmax) of 1 μm or less, ten point average roughness (Rz) of 0.5 μm or less, central plane peak height (Rp) of 0.5 μm or less, central plane valley depth (Rv) of 0.5 μm or less, central plane area factor (Sr) of from 10% to 90%, and average wavelength (λa) of from 5 μm to 300 μm. For obtaining desired electromagnetic characteristics and durability, surface protrusion distribution of the support can be controlled arbitrarily by fillers, e.g., the number of protrusions having sizes of from 0.01 µm to 1 µm can be controlled each within the range of from 0 to 2,000 per 0.1 mm$^2$.

The F-5 value of the support for use in the present invention is preferably from 5 to 50 kg/mm$^2$ (=about 49 to 490 MPa), the thermal shrinkage factor of the support at 100° C. for 30 minutes is preferably 3% or less, more preferably 1.5% or less, and the thermal shrinkage factor at 80° C. for 30 minutes is preferably 1% or less, more preferably 0.5% or less. The support has a breaking strength of from 5 to 100 kg/mm$^2$ (=about 49 to 980 MPa), an elastic modulus of from 100 to 2,000 kg/mm$^2$ (=about 0.98 to 19.6 GPa), a temperature expansion coefficient of from $10^{-4}$ to $10^{-8}$/° C., preferably from $10^{-5}$ to $10^{-6}$/° C., and a humidity expansion coefficient of $10^{-4}$/RH% or less, preferably $10^{-5}$/RH% or less. These thermal characteristics, dimensional characteristics and mechanical strength characteristics are preferably almost equal in every direction of in-plane of the support with difference of not more than 10%.

Producing Method

Producing process of the magnetic coating solution for the magnetic recording medium of the present invention comprises at least a kneading step, a dispersing step and, optionally, blending steps to be carried out before and/or after the kneading and dispersing steps. Each of these steps may be composed of two or more separate stages. All of the feedstocks such as a magnetic powder, a nonmagnetic powder, a binder, a carbon black, an abrasive, an antistatic agent, a lubricant, and a solvent, for use in the present invention may be added at any step at anytime. Each feedstock may be added at two or more steps dividedly. For example, polyurethane can be added dividedly at a kneading step, a dispersing step, or a blending step for adjusting viscosity after dispersion. For achieving the object of the present invention, conventionally well-known techniques can be performed partly with the above steps. Powerful kneading machines such as an open kneader, a continuous kneader, a pressure kneader or an extruder are preferably used in a kneading step. When a kneader is used, all or a part of the binder (preferably 30% or more of the total binders) is kneading-treated in the range of from 15 parts to 500 parts per 100 parts of the magnetic powder or nonmagnetic powder together with the magnetic powder or the nonmagnetic powder. These kneading are disclosed in detail in JP-A-1-106338 and JP-A-1-79274. For dispersing a magnetic layer solution and a nonmagnetic layer solution, glass beads can be used, and dispersing media having a high specific gravity, e.g., zirconia beads, titania beads and steel beads are preferred for this purpose. Optimal particle size and packing density of these dispersing media should be selected. Well-known dispersing apparatus can be used in the present invention.

For realizing the constitution of the present invention, successive multilayer coating of coating a lower layer and then coating a magnetic layer after the lower layer has been dried is used. A well-known successive multilayer coating method, i.e., a wet-on-dry coating method, is used, e.g., the methods disclosed in JP-A-3-214417 and JP-A-3-214422 are preferably used.

The magnetic recording medium is subjected to orientation treatment after coating, if necessary.

In the case of a magnetic disc, isotropic orienting property can be sufficiently obtained in some cases without performing orientation using orientating apparatus, but it is preferred to use well-known random orientation apparatuses, to thereby dispose cobalt magnets diagonally and alternately or apply an alternating current magnetic field using a solenoid. Hexagonal ferrites in general have an inclination for three dimensional random orientation of in-plane and in the vertical direction but it is also possible to make in-plane two dimensional random orientation. Further, it is also possible to impart isotropic magnetic characteristics in the circumferential direction by vertical orientation using well-known methods using, e.g., different pole and counter position magnets. Vertical orientation is particularly preferred when the disc is used in high density recording. Spin coating may be used for circumferential orientation.

In the case of a magnetic tape, orientation is effected in the machine direction by a cobalt magnet and a solenoid. In orientation, it is preferred that the drying position of the coated film can be controlled by controlling the temperature and the amount of drying air and coating rate. Coating rate is preferably from 20 to 1,000 m/min. and the temperature of drying air is preferably 60° C. or more. Preliminary drying can be performed appropriately before entering the magnet zone.

Heat resisting plastic rolls, e.g., epoxy, polyimide, polyamide and polyimideamide or metal rolls are used for calendering treatment. Metal rolls are preferably used for the treatment particularly when magnetic layers are coated on both surfaces of a support. The treatment temperature is preferably 50° C. or more, more preferably 100° C. or more. The linear pressure is preferably 200 kg/cm (=about 196 kN/m) or more, more preferably 300 kg/cm (=about 294 kN/m) or more.

Physical Properties

The residual magnetic flux density×magnetic layer thickness in the present invention is preferably from 5 to 200 mT·µm. The coercive force (Hc) is preferably from 1,800 to 5,000 Oe (=about 144 to 400 kA/m), preferably from 1,800 to 3,000 Oe (=about 144 to 240 kA/m). The distribution of the coercive force is preferably narrow, and SFD (switching field distribution) and SFDr are preferably 0.6 or less.

The squareness ratio of a magnetic disc is from 0.55 to 0.67, preferably from 0.58 to 0.64, in the case of two dimensional random orientation, from 0.45 to 0.55 in the case of three dimensional random orientation, and in the case of vertical orientation, generally 0.6 or more in the vertical direction, preferably 0.7 or more, and when diamagnetic correction is performed, 0.7 or more, preferably 0.8 or more. Degree of orientation of two dimensional random orientation and three dimensional random orientation is preferably 0.8 or more. In the case of two dimensional random orientation, the squareness ratio in the vertical direction, the Br in the vertical direction, and the Hc in the vertical direction are preferably from 0.1 to 0.5 times as small as those in the in-plane direction.

In the case of a magnetic tape, the squareness ratio is 0.7 or more, preferably 0.8 or more.

The magnetic recording medium in the present invention has a friction coefficient against a head at temperature of −10° C. to 40° C. and humidity of 0% to 95% of 0.5 or less, preferably 0.3 or less, the intrinsic resistivity of the magnetic layer surface of preferably from $10^4$ to $10^{12}$ Ω/sq, and the charge potential of preferably from −500 V to +500 V. The elastic modulus at 0.5% elongation of the magnetic layer is preferably from 100 to 2,000 kg/mm$^2$ (=about 980 to 19,600 MPa) in every direction of in-plane, the breaking strength is preferably from 10 to 70 kg/mm$^2$ (=about 98 to 686 MPa), the elastic modulus of the magnetic recording medium is preferably from 100 to 1,500 kg/mm$^2$ (=about 980 to 14,700 MPa) in every direction of in-plane, the residual elongation is preferably 0.5% or less, and the thermal shrinkage factor at every temperature of 100° C. or less is preferably 1% or less, more preferably 0.5% or less, and most preferably 0.1% or less. The glass transition temperature of the magnetic layer (the maximum point of the loss elastic modulus by dynamic visco-elasticity measurement at 110 Hz) is preferably from 50° C. to 120° C., and that of the lower layer is preferably from 0° C. to 100° C. The loss elastic modulus is preferably in the range of from $1\times10^7$ to $8\times10^8$ Pa, and loss tangent is preferably 0.2 or less. If loss tangent is too large, adhesion failure is liable to occur. These thermal and mechanical characteristics are preferably almost equal in every direction of in-plane of the medium with difference of not more than 10%. The residual amount of a solvent in the magnetic layer is preferably 100 mg/m$^2$ or less, more preferably 10 mg/m$^2$ or less. The void ratio of the coated layer is preferably 30% by volume or less, more preferably 20% by volume or less, with both of the lower layer and the upper layer. The void ratio is preferably smaller for obtaining high output but in some cases a specific value should be preferably secured depending on purposes. For example, in a disc-like medium which is repeatedly used, large void ratio contributes to good running durability in many cases.

The magnetic layer has a central plane average surface roughness (Ra) measured by a surface roughness meter TOPO-3D (a product of WYKO Co.) of preferably 5.0 nm or less, more preferably 4.0 nm or less, and especially preferably 3.5 nm or less. The magnetic layer preferably has maximum height (Rmax) of 0.5 μm or less, ten point average roughness (Rz) of 0.3 μm or less, central plane peak height (Rp) of 0.3 μm or less, central plane valley depth (Rv) of 0.3 μm or less, central plane area factor (Sr) of from 20% to 80%, and average wavelength (λa) of from 5 μm to 300 μm. The surface protrusions of the magnetic layer of sizes of from 0.01 μm to 1 μm can be controlled arbitrarily within the range of from 0 to 2,000, and it is preferred to optimize electromagnetic characteristics and a friction coefficient by controlling the surface protrusions of the magnetic layer. The surface protrusions can be easily controlled by the control of the surface property of the support by fillers, the particle size and the amount of the magnetic powders added to the magnetic layer, or by the surface shapes of the rolls of calender treatment. The range of curling is preferably within ±3 mm. It can be easily presumed that these physical properties of the magnetic recording medium in the present invention can be varied according to purposes in the lower layer and the upper layer. For example, the elastic modulus of the upper layer is made higher to improve running durability and at the same time the elastic modulus of the lower layer is made lower than that of the upper layer to improve the head touching of the magnetic recording medium.

EXAMPLE

The present invention will be described in detail below with reference to the specific examples, but the present invention should not be construed as being limited thereto. In the examples, "part" means "mass part (i.e., weight part)" unless otherwise indicated.

Sample 1

Each composition of Magnetic Coating Solution A and Nonmagnetic Coating Solution shown below was blended in a kneader, and dispersed with a sand mill. Polyisocyanate was added to each resulting dispersion solution, in an amount of 13 parts to Nonmagnetic Coating Solution and 4 parts to Magnetic Coating Solution A, and 30 parts of cyclohexanone was further added to each solution. Each solution was filtered through a filter having an average pore diameter of 1 μm to obtain coating solutions for forming a nonmagnetic layer and a magnetic layer.

The thus-obtained nonmagnetic coating solution was coated on a polyethylene terephthalate support having a thickness of 62 μm and a central plane average surface roughness of 3 nm in a dry thickness of 1.5 μm, and after drying the nonmagnetic layer (W/D coating), a magnetic layer was multilayer-coated in a thickness of 0.1 μm. After drying, the coated layers were subjected to calendering treatment with calenders of 7 stages at 90° C. at linear pressure of 300 kg/cm (294 kN/c). The obtained web was punched to a disc of 3.7 inches, and the disc was subjected to surface treatment by abrasives.

Sample 2

A magnetic layer coating solution and a nonmagnetic layer coating solution were prepared in the same manner as in the preparation of Sample 1. The obtained coating solutions were simultaneously multilayer-coated (W/W coating) on a polyethylene terephthalate support having a thickness of 62 μm and a central plane average surface roughness of 3 nm. The nonmagnetic layer coating solution was coated in a dry thickness of 1.5 μm, immediately after that the magnetic layer coating solution was coated on the nonmagnetic layer so as to obtain the magnetic layer having a thickness of 0.1 μm. The coated layers were subjected to random orientation while the magnetic layer and the nonmagnetic layer were still wet. After drying, the coated layers were subjected to calendering treatment with calenders of 7 stages at 90° C. at linear pressure of 300 kg/cm. The obtained web was punched to a disc of 3.7 inches, and the disc was subjected to surface treatment by abrasives.

Samples 3 to 12 and 21 to 28

Samples were prepared in the same manner as in the preparation of Sample 1 except that the average particle size and the addition amount of the diamond particles added to each magnetic layer coating solution were changed as shown in Table 1 below.

Sample 13

A sample was prepared in the same manner as in the preparation of Sample 1 except for using Magnetic Coating Solution B in place of Magnetic Coating Solution A.

Sample 14

A sample was prepared in the same manner as in the preparation of Sample 2 except for using Magnetic Coating Solution B in place of Magnetic Coating Solution A.

Sample 15

A sample was prepared in the same manner as in the preparation of Sample 1 except for changing the magnetic layer thickness from 0.1 μm to 0.15 μm.

Sample 16

A sample was prepared in the same manner as in the preparation of Sample 1 except for changing the magnetic layer thickness from 0.1 μm to 0.2 μm.

Sample 17

A sample was prepared in the same manner as in the preparation of Sample 2 except for changing the magnetic layer thickness from 0.1 μm to 0.2 μm.

Sample 18

A sample was prepared in the same manner as in the preparation of Sample 1 except for reducing the time of dispersion of the nonmagnetic coating solution by a sand mill to one half.

Sample 19

A sample was prepared in the same manner as in the preparation of Sample 1 except for reducing the time of dispersion of the nonmagnetic coating solution by a sand mill to one third.

Sample 20

A sample was prepared by coating the nonmagnetic coating solution used in Sample 1, drying, subjecting the coated layer to calendering treatment with calenders of 7 stages at 90° C. at linear pressure of 300 kg/cm, then multilayer-coating a magnetic layer in a thickness of 0.1 µm, drying, and again subjecting the coated layers to calendering treatment with calenders of 7 stages at 90° C. at linear pressure of 300 kg/cm (294 kN/c). The obtained web was punched to a disc of 3.7 inches, and the disc was subjected to surface treatment by abrasives.

| Preparation of Coating Solution | |
|---|---|
| Magnetic Coating Solution A | |
| Ferromagnetic metal fine powder | 100 parts |
| Composition: Fe 70 atomic %, Co 30 atomic % | |
| Hc: 2,300 Oe (184 kA/m) | |
| Average long axis length: 0.06 µm | |
| Specific surface area: 55 m$^2$/g | |
| Crystallite size: 115 Å | |
| $\sigma_s$: 110 A · m$^2$/kg | |
| Sintering inhibitor: | |
| Al compound (Al/Fe, 14 atomic %) | |
| Y compound (Y/Fe, 7 atomic %) | |
| Vinyl chloride polymer | 10 parts |
| MR110 (manufactured by Nippon Zeon Co., Ltd.) | |
| Polyurethane resin | 4 parts |
| UR 8200 (manufactured by Toyobo Co., Ltd.) | |
| α-Alumina | 5 parts |
| Average particle size: 0.15 µm | |
| Diamond particles | shown in Table 1 |
| (average particle size is shown in Table 1) | |
| Carbon black | 1 part |
| #50 (manufactured by Asahi Carbon Co., Ltd.) | |
| Phenylphosphonic acid | 3 parts |
| n-Butyl stearate | 1 part |
| Butoxyethyl stearate | 1 part |
| Isocetyl stearate | 2 parts |
| Stearic acid | 1 part |
| Oleic acid | 1 part |
| Methyl ethyl ketone | 140 parts |
| Cyclohexanone | 200 parts |
| Magnetic Coating Solution B | |
| Hexagonal barium ferrite | 100 parts |
| Surface treatment: Al$_2$O$_5$ 5 mass %, SiO$_2$ 2 mass % | |
| Hc: 2,500 Oe (200 kA/m) | |
| Average tabular diameter: 30 nm | |
| Tabular ratio: 3 | |
| $\sigma_s$: 56 A · m$^2$/kg | |
| Vinyl chloride copolymer | 6 parts |
| MR110 (manufactured by Nippon Zeon Co., Ltd.) | |
| Polyurethane resin | 3 parts |
| UR 8200 (manufactured by Toyobo Co., Ltd.) | |
| α-Alumina | 4 parts |
| HIT60 (manufactured by Sumitomo Chemical Co., Ltd.) | |
| Diamond particles | shown in Table 1 |
| (average particle size is shown in Table 1) | |
| Carbon black | 1 part |
| #50 (manufactured by Asahi Carbon Co., Ltd.) | |
| Isocetyl stearate | 5 parts |
| Stearic acid | 1 part |
| Oleic acid | 1 part |
| Methyl ethyl ketone | 80 parts |
| Cyclohexanone | 120 parts |
| Nonmagnetic Coating Solution (lower layer) | |
| Nonmagnetic powder: α-Fe$_2$O$_3$ | 100 parts |
| Average long axis length: 0.07 µm | |
| Average short axis length: 0.014 µm | |
| Specific surface area (S$_{BET}$): 55 m$^2$/g | |
| pH: 9 | |
| Surface-covering compound: Al$_2$O$_3$, | |
| 8 mass % based on the total particles | |
| Carbon black | 25 parts |
| CONDUCTEX SC-U (manufactured by Columbia Carbon Co., Ltd.) | |
| Vinyl chloride copolymer | 15 parts |
| MR110 (manufactured by Nippon Zeon Co., Ltd.) | |
| Polyurethane resin | 7 parts |
| UR 5500 (manufactured by Toyobo Co., Ltd.) | |
| Phenylphosphonic acid | 4 parts |
| Isocetyl stearate | 6 parts |
| Oleic acid | 1.3 parts |
| Stearic acid | 1.3 parts |
| Methyl ethyl ketone/cyclohexanone (8/2 mixture) | 250 parts |

The performances of the above-obtained samples were evaluated as follows. The results obtained are shown in Table 1 below.

S/N Ratio

S/N ratio was measured using RAW1001 type disc evaluating apparatus (manufactured by GUZIK Co., U.S.A.), a spin stand LS-90 (manufactured by Kyodo Electron System Co., Ltd.), and a metal-in-gap head having a gap length of 0.2 µm. Writing of signals of line recording density 100 KFCI was performed at the position of radius of 24.6 mm, and the recorded signals were reproduced using an MR head having a track width of 2.6 µm. S/N ratio was obtained from the reproduction output (TAA) and the noise level after DC erasure of the disc.

PW50 (Half Value Breadth of Isolated Pulse (Wave) Shape)

PW50 was measured using RWA1001 type disc evaluating apparatus (manufactured by GUZIK Co., U.S.A.), a spin stand LS-90 (manufactured by Kyodo Electron System Co., Ltd.), and a metal-in-gap head having a track width of 5 µm and a gap length of 0.2 µm. PW50 was obtained by performing writing of signals of isolated pulse (wave) shape at the position of radius of 24.6 mm, and reproducing the recorded signals using an MR head having track width of 2.6 µm.

Evaluation of Fluctuation of Magnetic Layer Thickness by EPMA

Intensity mapping of the objective element in the range of 100×100 µm from the magnetic layer surface was performed by at least 500×500 pixel on conditions of an electron beam accelerating voltage of 15 kV, 30 nA, and a beam diameter of 1 µmφ using EPMA-1600 manufactured by Shimadzu Seisakusho Co. In the case of ferromagnetic metal powders, Co was selected as the inherent element of the magnetic layer, and in the case of hexagonal ferrite magnetic powder, Ba was selected as the inherent element of the magnetic layer.

In the result of the obtained intensity mapping of element, the intensity was divided to 256 stages, and the standard deviation of intensity distribution (b) and the average value (a) were obtained with an image analyzer KS400 manufactured by Zeiss Corp., and b/a was computed.

Evaluation of Running Durability

A floppy disc drive (ZIP100, a product of IOMEGA CORP., U.S.A., rotation number: 2,968 rpm) was used and the head was fixed at the position of radius of 38 mm. Recording was performed with recording density of 34 kfci, and the recorded signals were reproduced and this was taken as 100%. The disc was run under the thermo-cycle condition for 1,500 hours with the flow shown in Table 2 below as one cycle. Output was monitored every 24 hours of running and the point when the output became 70% or less of the initial value was taken as NG.

TABLE 1

| Sample No. | Remarks | Magnetic Coating Solution | Diamond Average Particle Size (μm) | X Magnetic Layer Thickness* | Addition Amount (parts) |
|---|---|---|---|---|---|
| 1 | Invention | A | 0.1 | 1 | 1 |
| 2 | Comparison | A | 0.1 | 1 | 1 |
| 3 | Invention | A | 0.2 | 2 | 1 |
| 4 | Comparison | A | 0.3 | 3 | 1 |
| 5 | Invention | A | 0.02 | 0.2 | 1 |
| 6 | Comparison | A | 0.01 | 0.1 | 1 |
| 7 | Invention | A | 0.1 | 1 | 3 |
| 8 | Invention | A | 0.1 | 1 | 5 |
| 9 | Comparison | A | 0.1 | 1 | 10 |
| 10 | Invention | A | 0.1 | 1 | 0.5 |
| 11 | Invention | A | 0.1 | 1 | 0.1 |
| 12 | Comparison | A | 0.1 | 1 | 0.05 |
| 13 | Invention | B | 0.1 | 1 | 1 |
| 14 | Comparison | B | 0.1 | 1 | 1 |
| 15 | Invention | A | 0.1 | 0.67 | 1 |
| 16 | Comparison | A | 0.1 | 0.5 | 1 |
| 17 | Comparison | A | 0.1 | 0.5 | 1 |
| 18 | Invention | A | 0.1 | 1 | 1 |
| 19 | Invention | A | 0.1 | 1 | 1 |
| 20 | Invention | A | 0.1 | 1 | 1 |
| 21 | Comparison | A | 0.02 | 0.2 | 0.05 |
| 22 | Invention | A | 0.02 | 0.2 | 0.1 |
| 23 | Invention | A | 0.02 | 0.2 | 5 |
| 24 | Comparison | A | 0.02 | 0.2 | 8 |
| 25 | Comparison | A | 0.2 | 2 | 0.05 |
| 26 | Invention | A | 0.2 | 2 | 0.1 |
| 27 | Invention | A | 0.2 | 2 | 5 |
| 28 | Comparison | A | 0.2 | 2 | 8 |

| Sample No. | Magnetic Layer Thickness (μm) | Coating Method | Lower Layer Ra (nm) | b/a (%) | S/N (dB) | PW50 (μm) | Duration of life (hr) (Running Durability) |
|---|---|---|---|---|---|---|---|
| 1 | 0.1 | wet-on-dry | 10 | 20 | 28 | 0.3 | 1,500< |
| 2 | 0.1 | wet-on-wet | — | 50 | 20 | 0.4 | 1,500< |
| 3 | 0.1 | wet-on-dry | 10 | 25 | 27 | 0.3 | 1,500< |
| 4 | 0.1 | wet-on-dry | 10 | 40 | 22 | 0.3 | 800 |
| 5 | 0.1 | wet-on-dry | 10 | 18 | 29 | 0.3 | 1,500< |
| 6 | 0.1 | wet-on-dry | 10 | 17 | 29 | 0.3 | 500 |
| 7 | 0.1 | wet-on-dry | 10 | 22 | 27 | 0.3 | 1,500< |
| 8 | 0.1 | wet-on-dry | 10 | 25 | 26 | 0.3 | 1,500< |
| 9 | 0.1 | wet-on-dry | 10 | 40 | 22 | 0.3 | 500 |
| 10 | 0.1 | wet-on-dry | 10 | 18 | 29 | 0.3 | 1,500< |
| 11 | 0.1 | wet-on-dry | 10 | 17 | 29 | 0.3 | 1,200 |
| 12 | 0.1 | wet-on-dry | 10 | 17 | 30 | 0.3 | 500 |
| 13 | 0.1 | wet-on-dry | 10 | 20 | 32 | 0.3 | 1,500< |
| 14 | 0.1 | wet-on-wet | — | 50 | 24 | 0.3 | 1,500< |
| 15 | 0.15 | wet-on-dry | 10 | 15 | 27 | 0.32 | 1,500< |
| 16 | 0.2 | wet-on-dry | 10 | 10 | 24 | 0.45 | 1,500< |
| 17 | 0.2 | wet-on-wet | — | 30 | 22 | 0.5 | 1,500< |
| 18 | 0.1 | wet-on-dry | 20 | 25 | 27 | 0.3 | 1,500< |
| 19 | 0.1 | wet-on-dry | 30 | 30 | 24 | 0.3 | 1,500< |
| 20 | 0.1 | wet-on-dry | 5 | 10 | 29 | 0.3 | 1,500< |
| 21 | 0.1 | wet-on-dy | 10 | 18 | 30 | 0.3 | 300 |
| 22 | 0.1 | Wet-on-dry | 10 | 18 | 30 | 0.3 | 1,000 |
| 23 | 0.1 | Wet-on-dry | 10 | 18 | 28 | 0.3 | 1,500< |
| 24 | 0.1 | Wet-on-dry | 10 | 18 | 23 | 0.3 | 800 |
| 25 | 0.1 | Wet-on-dry | 10 | 25 | 28 | 0.3 | 700 |
| 26 | 0.1 | Wet-on-dry | 10 | 25 | 28 | 0.3 | 1,500< |
| 27 | 0.1 | Wet-on-dry | 10 | 25 | 26 | 0.3 | 1,000 |
| 28 | 0.1 | Wet-on-dry | 10 | 25 | 20 | 0.3 | 300 |

*x Magnetic layer thickness: It shows that how many times does the average particle size correspond to the magnetic layer thickness.

TABLE 2

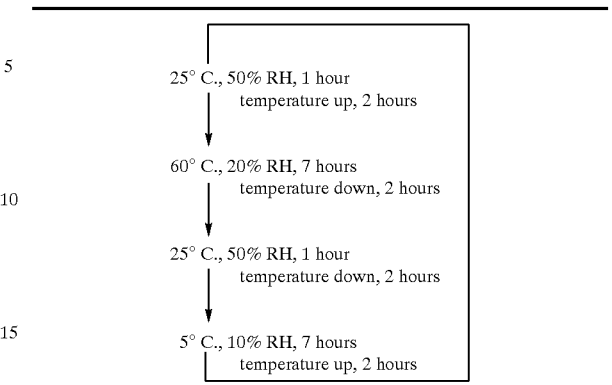

As is apparent from the results shown in Table 1, the samples according to the present invention are excellent in all of S/N, PW50 and durability, however, the comparative samples are inferior to the samples of the present invention in any of these properties.

Effect of the Invention

It is essential to heighten track density for increasing the capacity of magnetic recording media, however, it becomes necessary to adopt an MR head with the thinning of a track width. The MR head has high sensitivity, but is susceptible to medium noise, and microscopic thickness dispersion of a magnetic layer causes noises, and this tendency is conspicuous when a magnetic layer thickness is as thin as 0.15 μm or less. It has been found that wet-on-dry (W/D) coating is effective for reducing noises attributable to the distribution of a magnetic layer thickness.

On the other hand, so far it has not been possible to secure sufficient durability with the samples formed by W/D coating, but according to the present invention sufficient durability could be obtained by adding diamond particles having an average particle size of from 1/5 to 2 times the thickness of a magnetic layer to the magnetic layer in an amount of from 0.1 to 5.0 mass % based on the amount of the ferromagnetic powder.

The entitle disclosure of each and every foreign patent application from which the benefit of foreign priority has been claimed in the present application is incorporated herein by reference, as if fully set forth herein.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a support having provided thereon a substantially nonmagnetic lower layer by coating a lower layer coating solution comprising a nonmagnetic powder dispersed in a binder and drying, and a magnetic layer having a thickness of from 0.01 to 0.15 μm by coating a magnetic layer coating solution comprising a ferromagnetic metal powder or a hexagonal ferrite powder dispersed in a binder, wherein the magnetic layer further contains diamond particles having an average particle size of from 1/5 to 2 times the thickness of the magnetic layer in an amount of from 0.1 to 5.0 mass % based on the ferromagnetic metal powder or the hexagonal ferrite powder, and has the standard deviation of intensity distribution (b)/the average value (a) of from 10% to 25%.

2. A reproduction method utilizing an MR head comprising the magnetic recording medium of claim 1.

3. The magnetic recording medium of claim 1, wherein the magnetic layer further comprises diamond particles having an average particle size of from 1/5 to 2 times the thickness of the magnetic layer in an amount of from 0.5 to 3 mass % based on the ferromagnetic metal powder or the hexagonal ferrite powder.

4. The magnetic recording medium of claim 3, wherein the maximum value of a particle size of the diamond particles is about 0.4 µm.

5. The magnetic recording medium recording medium of claim 3, wherein the minimum value of a particle size of the diamond particles is about 0.01 µm.

6. The magnetic recording medium of claim 1, wherein an average tabular diameter of the hexagonal ferrite powders is from 10 to 35 nm.

7. The magnetic recording medium of claim 1, wherein a tabular ration of the hexagonal ferrite powders is from 1 to 7.

8. The magnetic recording medium of claim 1, wherein a coercive force of the hexagonal ferrite powders is from about 500 to about 5,000 Oe.

* * * * *